(12) United States Patent
Boyd

(10) Patent No.: US 6,604,936 B2
(45) Date of Patent: Aug. 12, 2003

(54) APPARATUS FOR INJECTION MOLDING

(75) Inventor: Thomas John Boyd, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 124 days.

(21) Appl. No.: 09/920,088

(22) Filed: Aug. 1, 2001

(65) Prior Publication Data

US 2003/0026870 A1 Feb. 6, 2003

(51) Int. Cl.⁷ .............................................. B29C 45/02
(52) U.S. Cl. ...................................... 425/559; 425/560
(58) Field of Search ................................ 425/557, 558, 425/559, 560, 561

(56) References Cited

U.S. PATENT DOCUMENTS

| | | |
|---|---|---|
| 3,034,175 A | 5/1962 | Hehl |
| 3,068,520 A | 12/1962 | Hehl |
| 3,173,176 A | 3/1965 | Kobayashi |
| 3,350,746 A | 11/1967 | Blumer |
| 3,609,815 A | 10/1971 | Rudolf et al. |
| 4,158,381 A | 6/1979 | Michelson ................. 164/226 |
| 4,547,140 A | 10/1985 | Davis ......................... 425/138 |
| 4,613,475 A | 9/1986 | Hettings ..................... 264/328 |
| 4,632,651 A | 12/1986 | Van der Ohe et al. ...... 425/135 |
| 4,695,238 A | 9/1987 | Taniguchi ................... 425/145 |
| 4,950,146 A | 8/1990 | Adachi ....................... 425/149 |
| 4,976,603 A | 12/1990 | Disimone ................... 425/556 |
| 5,112,212 A | 5/1992 | Akselrud et al. ........... 425/557 |
| 5,112,213 A | 5/1992 | Oas ............................ 425/562 |
| 5,122,051 A | 6/1992 | Joyner ........................ 425/556 |
| 5,131,226 A | 7/1992 | Hendry ........................ 60/418 |
| 5,153,007 A | 10/1992 | Watkins ..................... 425/143 |
| 5,253,999 A | 10/1993 | Kosuge ...................... 425/575 |
| 5,286,186 A | 2/1994 | Brown et al. .............. 425/164 |
| 5,334,009 A | 8/1994 | Urbanek et al. ........... 425/164 |
| 5,435,715 A | 7/1995 | Campbell ................... 425/576 |
| 5,490,772 A | 2/1996 | Gaigl ......................... 425/126 |
| 5,814,358 A * | 9/1998 | Bock .......................... 425/557 |
| 5,902,611 A | 5/1999 | Stegmaier .................. 425/145 |
| 5,975,872 A | 11/1999 | Raines et al. .............. 425/136 |
| 6,193,499 B1 | 2/2001 | Klaus et al. ............... 425/557 |
| 6,203,311 B1 | 3/2001 | Dray .......................... 425/562 |
| 6,241,508 B1 | 6/2001 | John et al. ................. 425/559 |

* cited by examiner

*Primary Examiner*—Tim Heitbrink
(74) *Attorney, Agent, or Firm*—Richard B O'Planick; Nancy T Krawczyk

(57) ABSTRACT

The injection molding machine has an extruder for providing molding material, a cavity for retaining the molding material prior to injection into a mold, a plunger within the cavity to move the material out of the cavity, and a check valve. The check valve has separate means to permit the material to flow from the extruder to the cavity and from the cavity to an adjacent mold. By having separate flow channels for molding and recharging, the injection molding machine may be recharged on the fly.

10 Claims, 4 Drawing Sheets

US 6,604,936 B2

APPARATUS FOR INJECTION MOLDING

FIELD OF THE INVENTION

The present invention is directed to an apparatus for injection molding. More specifically, the disclosed apparatus allows for reduced injection cycle time when injecting rubber.

BACKGROUND OF THE INVENTION

Injection molding presses for injecting molding materials into molds are well known in the manufacturing industry. Molding materials such as rubber composites must typically be cured within their molds under specific temperature and pressure conditions. Prior to the injection of molding material into the mold, the injection press clamps the mold so that the mold is under pressure during the injection operation.

The time required for each molding cycle may be six minutes or more. A molding cycle typically includes the steps of clamping the mold, injecting material into the mold, holding the mold in a clamped condition with the injection nozzle still contacting the mold to initiate curing, and recharging the injection unit with material. Such molding cycle times are required, since the molds must remain under pressure within the press to complete the injection operation, initiate curing, and recharge the injection unit with molding material for the next cycle. Recharging of the unit with material occurs during this time in order to prevent any loss of material from the unit and so that when the next mold is presented to the unit for filling, filling may be immediately begin.

U.S. Pat. No. 5,286,186 discloses an apparatus for injection molding rubber. The apparatus has both a check valve to prevent molding material from passing back into the extruder during injection of the material and a separate shut-off valve to prevent molding material from passing to the injection nozzle during recharging of the internal cavity. The check valve and the shut-off valve do not operate together such that when one is activated the other is automatically operated and material may still pass through one of the valves when not desired.

SUMMARY OF THE INVENTION

The present invention provides a new and improved apparatus for performing a molding process. The apparatus is designed to increase the number of molds processed in a specific time period by permitting recharging of the injection molding machine on the fly.

The injection molding machine has an extruder for providing molding material, a cavity for retaining the molding material prior to injection into a mold, a plunger within the cavity to move the material out of the cavity, and a check valve. The check valve has separate means to permit the material to flow from the extruder to the cavity and from the cavity to an adjacent mold.

The check valve has an injection outlet port to permit flow from the cavity to an injection nozzle and a transfer column to permit flow from the extruder to the cavity. The injection outlet port and the transfer column are spaced from one another.

Movement of the check valve from a recharging position to an injecting position is activated by a hydraulic cylinder. The check valve is moved axially along its centerline to move the valve from an injecting position to a recharging position.

BRIEF DESCRIPTION OF THE DRAWINGS

The invention will be described by way of example and with reference to the accompanying drawings in which.

DETAILED DESCRIPTION OF THE INVENTION

Figure 1:
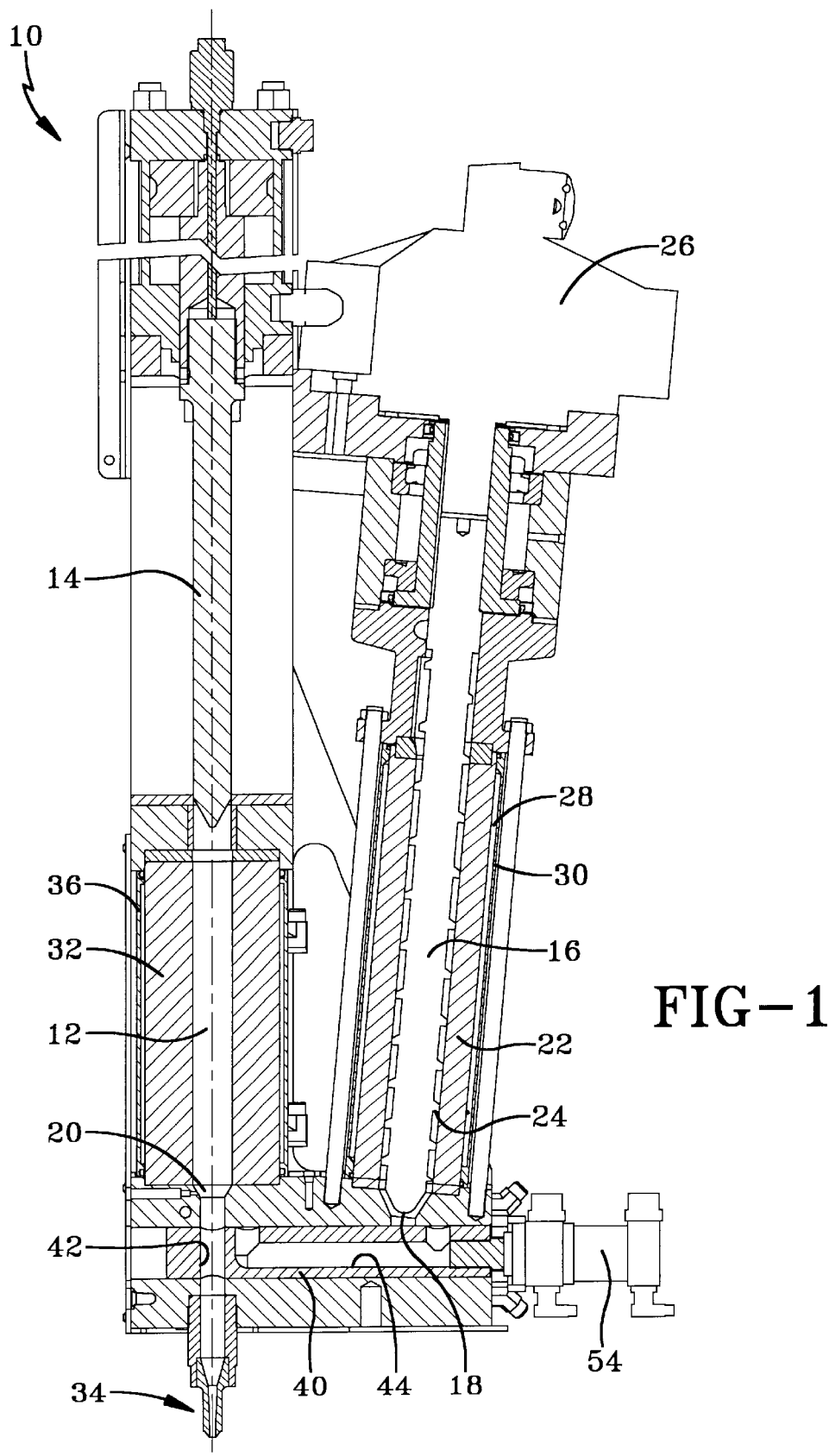
FIG. 1 is a cross sectional view of the injection apparatus.
Figure 2:
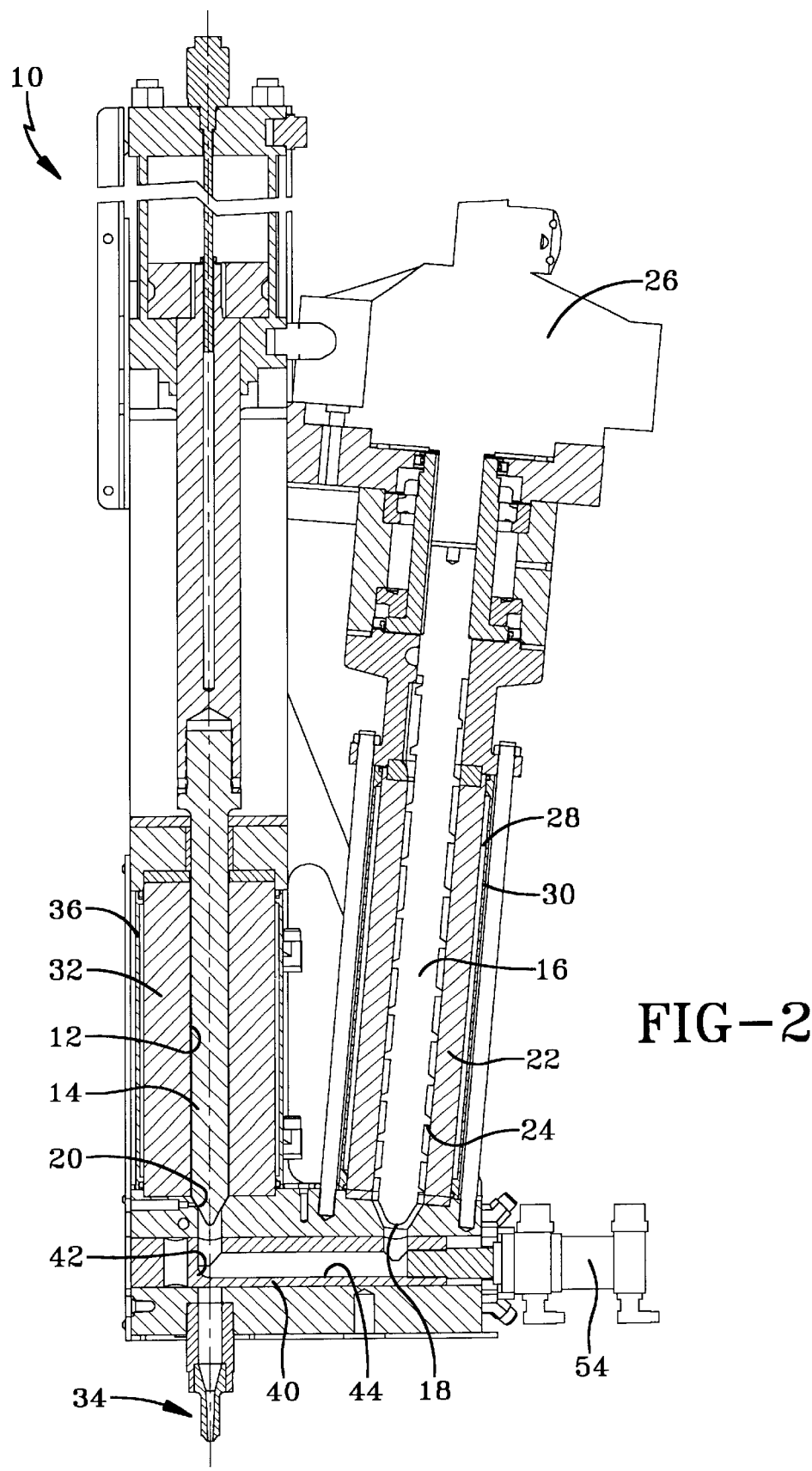
FIG. 2 is a cross sectional view of the injection apparatus.
Figure 4:
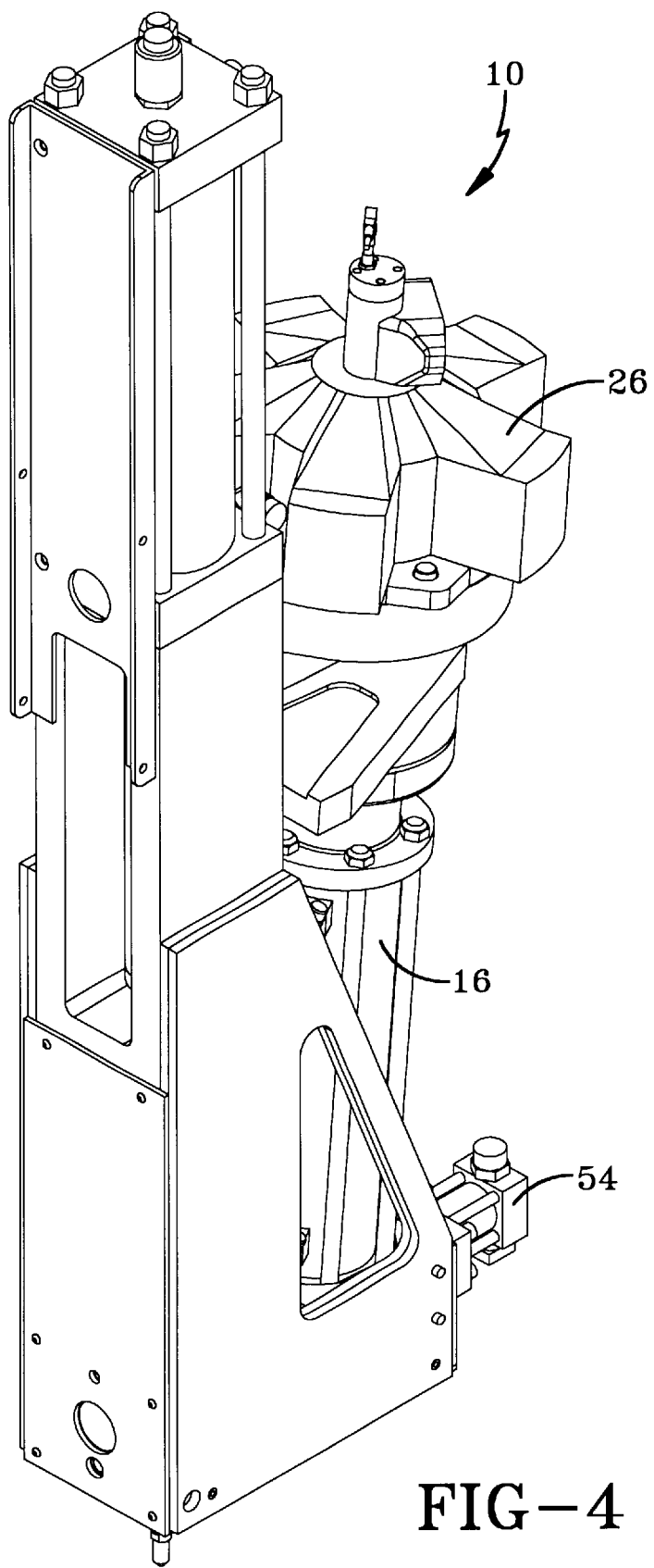
FIG. 4 is a perspective view of the injection apparatus.

An injection apparatus 10 in accordance with the present invention is illustrated in FIGS. 1, 2, and 4. The injector 10 has an internal cavity 12 with a plunger 14 to which a charge of molding material is supplied by the extruder 16. Once the internal cavity 12 is filled with material, the plunger 14 is activated to inject the material into an adjacent mold (not shown). To conserve space, the cavity 12 and the extruder 16 are located adjacent to one another, with the extruder 16 inclined at a low angle relative to the cavity 12 to reduce the distance between the exit port 18 of the extruder and the opening of the cavity 20.

The extruder 16 includes a barrel 22 with a single extruder screw 24 located within the barrel 22. An opening (not shown) is provided in the extruder barrel 22 for feeding strips of molding material into the barrel 22. Preferably, the molding material is rubber. The extruder screw 24 is driven by a reciprocating motor 26. Since heat is generated within the barrel 22 by mastication of the molding material, coolant flow is provided about the barrel 22 in a coolant flow area 28. The desired temperature is maintained by a thermal jacket 30 and monitored by thermocouplings located about the barrel 22.

The internal cavity 12 is located within a housing 32. After the cavity 12 is filled with material, the material is pushed out of the cavity 12 by the plunger 14 and to the nozzle 34. The nozzle 34, at that time, is engaged in a sealing relationship with a sprue opening of a mold. To maintain the desired temperature in the internal cavity 12, cooling jacket 36 is provided about the cavity housing 32 and coolant is provided similar to the extruder.

Figure 3:
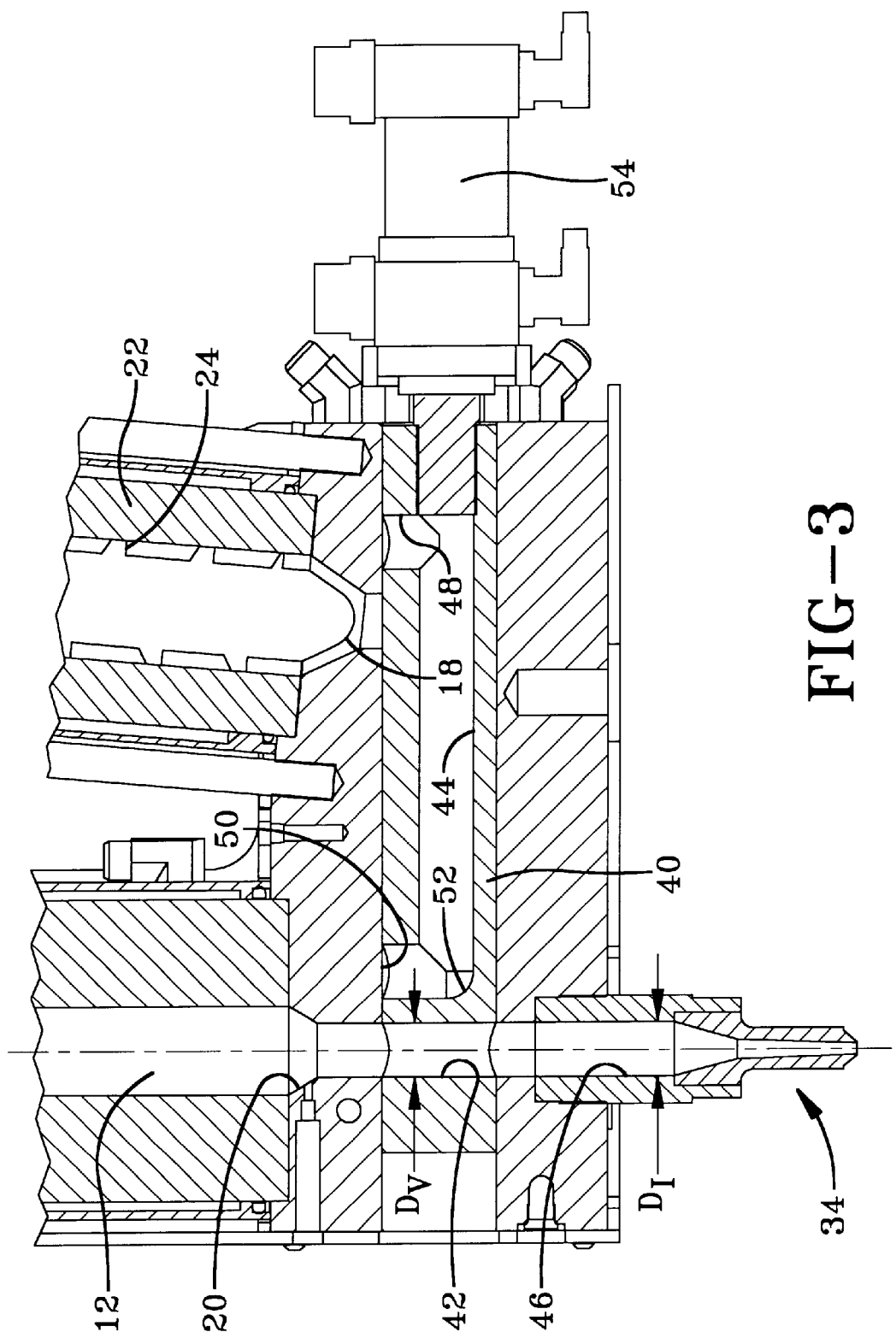
FIG. 3 is a cross sectional view of the check valve.

Connecting the extruder 16 and the internal cavity 12 and connecting the internal cavity 12 and the nozzle 34 is the check valve 40. The check valve 40 has a block configuration, see FIG. 3. The check valve 40 has an injection outlet port 42 and a transfer column 44. The injection outlet port 42 permits material to flow from the internal cavity 12 to the nozzle 34 and the transfer column 44 permits material to flow from the extruder 16 to the cavity 12.

The injection outlet port 42 is located at one end of the check valve 40. The injection outlet port 42 has an internal diameter $D_V$ equivalent to the diameter $D_I$ of the nozzle tube 46. If desired, for the purpose of altering the material flow pressure, the port diameter $D_V$ may be greater than the diameter $D_t$ of the nozzle tube 46. When aligned for use, the injection outlet port 42 connects the nozzle 34 to the internal cavity 12 to allow the molding material to pass from the cavity 12 to the nozzle 34 and into a mold.

Distanced from the injection outlet port 42 is the transfer column 44. The transfer column 44 connects the extruder 16 and the cavity 12, permitting material to flow from the extruder 16 to the cavity 12 when the injector 10 is being recharged with molding material. The column 44 has an entrance port 48 and an exit port 50. When aligned for use, the entrance port 48 connects to the extruder 16 and the exit port 50 connects to the internal cavity 12. The illustrated column is shown with two bends 52 in the column. For material flow purposes, any bends 52 in the column 44 are preferably constructed to reduce material build up in the bends 52 and the creation of dead zones.

Below the check valve 40 is a hydraulic cylinder 54 for moving the check valve 40 between the injection and the recharging position. The hydraulic cylinder 54 has a position sensor for indicating what position the cylinder 54 is in, and thus, what position the check valve 40 is in. The check-valve 40 is in injection position when the injection outlet port 42 is aligned with the nozzle 34 and the internal cavity 12, as seen in FIG. 1. The check valve 40 is in recharging position when the transfer column 44 permits the flow of material from the extruder 16 to the cavity 12, as seen in FIG. 2.

As noted, the check valve 40 has a block configuration. The configuration may have an overall circular, square, triangular, or polygonal shape. When the check valve 40 is formed in a non-circular block configuration, it reduces any accidental or incidental radial rotation of the check valve 40 within the apparatus, reducing the possibility of misalignment of the injection outlet port 42 and the transfer column 44.

The main portion of the transfer column 44, and the associated portion of the hydraulic cylinder 54, is illustrated as axially off-center in the check valve 40. By axially offsetting the column 44, rotation of the check valve 40 is precluded and prevents misalignment of the check valve 40. If the configuration of the check valve 40 is non-circular, than the transfer column 44 may also be located along the central axis of the block and rotation of the check valve 40 is precluded by the check valve configuration. Other means of preventing radial rotation of the check valve 40 may be used in addition to or instead of these specific means.

Operation of the apparatus occurs in the following manner. The hydraulic cylinder 54 is activated to move the transfer column 44 to the recharging position, as seen in FIG. 2. Molding material has been feed into the extruder screw 24. The material is masticated and conditioned by the screw 24. The material flows from the screw 24 into the column 44 and then into the internal cavity 12. As the material flows into the cavity 12, the plunger 14 is pushed back by the material to a position so that the volume in the cavity 12 is approximately equivalent to the volume of rubber to be injected into the mold.

After the required volume of material is in the internal cavity 12, the hydraulic cylinder 54 is activated to move the check valve 40 into the injecting position, as seen in FIG. 1. The plunger 14 is then moved forward to shoot the material into the injection outlet port 42 and then into the nozzle 34. At this time, the nozzle 34 is in contact with the mold sprue port, and the material passes from the nozzle 34 into the mold.

After all of the material is transferred to the mold, the hydraulic cylinder 54 is activated to return the check valve 40 to the recharging position, closing off any means for further material to continue to flow into the mold. Material that has already been prepared by the screw 24 now flows, via the transfer column 44, to the internal cavity 12, recharging the injector 10 and preparing for the next molding operation.

By forming the check valve 40 with two different mechanisms 42, 44 for injecting the material into the mold and for recharging the cavity 12, while the injector 10 is recharging, material cannot flow out of the nozzle 34, and during molding, excess material cannot flow from the screw 24 and into the nozzle 34. Because material cannot flow out the injector 10 during recharging, it makes it possible to recharge the injector 10 while "on the fly;" that is, the injector 10 may be recharged as either the injector 10 is moved to the next mold or as a new mold is being positioned adjacent to the injector 10 for filling. The disclosed check valve provides the injector 10 with a consistency and reliability that is not present with conventional check valves and shut-off valves.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the fill intended scope of the invention as defined by the following appended claims.

What is claimed is:

1. An apparatus for injection molding material into a mold, the apparatus comprising an extruder for providing molding material, a cavity for retaining the molding material prior to injection into a mold, a plunger within the cavity to move the material out of the cavity, a check valve, the check valve being characterized by:

the check valve comprising separate means to permit the material to flow from the extruder to the cavity and from the cavity to a mold;

the check valve having an external shape that inhibits rotation and misalignment of the check valve.

2. An apparatus in accordance with claim 1 wherein the check valve is activated by a hydraulic cylinder.

3. An apparatus in accordance with claim 1 wherein the check valve is block shaped.

4. An apparatus in accordance with claim 1 wherein the check valve moves axially along its centerline to move the valve from an injecting position to a recharging position.

5. An apparatus in accordance with claim 1 wherein the check valve has a radial cross-section configuration selected from the following group of circular, oval, triangular, and polygonal.

6. An apparatus for injection molding material into a mold, the apparatus comprising an extruder for providing molding material, an apparatus cavity having an access port for receiving the molding material prior to injection into a mold, a plunger within the cavity to move the material out of the apparatus cavity, a check valve, the check valve being characterized by:

(a) an internal transfer column cavity moving axially along a check valve centerline relative to the apparatus cavity access port;

(b) an entrance port communicating with the transfer column cavity and allowing passage of the molding material from the extruder to the transfer column cavity;

(c) an exit port communicating with the transfer column cavity and allowing passage of the molding material from the transfer column cavity into the apparatus cavity; and (d) an injection outlet port for allowing passage of the molding material from the apparatus cavity through the check valve.

7. An apparatus in accordance with claim 6 wherein the check valve moves axially along its centerline to move the valve from an injecting position to a recharging position, the valve entrance port and the valve exit port being closed in the injecting position and open in the recharging position, and the valve injection outlet port being open in the injecting position and closed in the recharging position.

8. An apparatus in accordance with claim 7 wherein the check valve moves reciprocally along its centerline between the injecting position to the recharging position to alternatively open and close the entrance port, the exit port, and the injection outlet port.

9. An apparatus in accordance with claim 7 wherein the check valve transfer column is transversely oriented relative to the apparatus cavity.

10. An apparatus in accordance with claim 6 wherein the injection outlet port extends transversely through the check valve relative to the check valve centerline.

* * * * *